US008428433B2

(12) United States Patent
Kim et al.

(10) Patent No.: US 8,428,433 B2
(45) Date of Patent: Apr. 23, 2013

(54) STORAGE MEDIUM STORING MULTIMEDIA DATA FOR REPRODUCTION OF AV DATA AND PROGRAMMING FUNCTION, AND REPRODUCING APPARATUS AND METHOD THEREOF

(75) Inventors: Kwang-min Kim, Anyang-si (KR); Jung-ho Lee, Yongin-si (KR); Kll-soo Jung, Hwaseong-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 12/421,090

(22) Filed: Apr. 9, 2009

(65) Prior Publication Data
US 2009/0214177 A1    Aug. 27, 2009

Related U.S. Application Data

(63) Continuation of application No. 11/211,705, filed on Aug. 26, 2005, now Pat. No. 7,826,713.

(30) Foreign Application Priority Data

Sep. 9, 2004 (KR) .................................. 2004-72215

(51) Int. Cl.
*H04N 9/80* (2006.01)
(52) U.S. Cl.
USPC ...................... 386/248; 386/248; 386/E5.001
(58) Field of Classification Search .................. 386/240, 386/248, E5.003
See application file for complete search history.

(56) References Cited

U.S. PATENT DOCUMENTS 6,031,962 A   2/2000  Sawabe et al.
6,701,064 B1  3/2004  De Haan et al.
6,999,674 B1  2/2006  Hamada et al.

(Continued)

FOREIGN PATENT DOCUMENTS

CN    1310445 A    8/2001
CN    1395422      2/2003

(Continued)

OTHER PUBLICATIONS

European Search Report issued on Jan. 28, 2010, in corresponding European Application No. 05781135.8 (10 pages).

(Continued)

*Primary Examiner* — Thai Tran
*Assistant Examiner* — Girumsew Wendmagegn
(74) *Attorney, Agent, or Firm* — NSIP Law

(57) ABSTRACT

A storage medium storing multimedia data for the reproduction of audio-visual (AV) data and a programming function, and a reproducing apparatus and method thereof. The storage medium includes: reproduction mode data for reproducing audio-visual (AV) data; program data including a plurality of program applications for providing interactive functions with a user and/or additional functions using the AV data; system data for controlling the execution of the reproduction mode data and the program data; and application objects for managing the execution of the program data and information on the reproduction mode data to be reproduced along with the execution of the program data. Accordingly, various user interfaces and/or various additional functions can be provided, as well as simple reproduction of AV data. Also the program application can be prevented from using malicious intent, and program applications having the same function can be reused without modification or recompilation.

2 Claims, 8 Drawing Sheets

U.S. PATENT DOCUMENTS

| | | | |
|---|---|---|---|
| 7,437,149 B1 | 10/2008 | Papineau et al. | |
| 7,702,222 B2 * | 4/2010 | Ikeda et al. | 386/334 |
| 7,826,713 B2 * | 11/2010 | Kim et al. | 386/241 |
| 2002/0088011 A1 | 7/2002 | Lamkin et al. | |
| 2003/0012558 A1 | 1/2003 | Kim et al. | |
| 2005/0198115 A1 | 9/2005 | Sugimoto et al. | |
| 2006/0077873 A1 | 4/2006 | Seo et al. | |

FOREIGN PATENT DOCUMENTS

| | | |
|---|---|---|
| EP | 1 551 027 | 7/2005 |
| EP | 1 672 637 | 6/2006 |
| JP | 07-014313 | 1/1995 |
| JP | 2002-343062 | 11/2002 |
| RU | 2000123689 | 7/2004 |
| WO | WO 03/065174 | 8/2003 |
| WO | WO 2004/025651 | 3/2004 |
| WO | WO 2004/084212 | 9/2004 |

OTHER PUBLICATIONS

Decision on Grant issued in Russian Patent Application No. 2007105889 on May 27, 2009.

Office Action issued in Chinese Patent Application No. 200580027795.4 dated Apr. 10, 2009.

Office Action issue on Nov. 22, 2011, in counterpart Japanese Patent Application No. 2007-531070, and English translation thereof.

Office Action issue on Dec. 13, 2011, in counterpart Japanese Patent Application No. 2009-93234, and English translation thereof.

Search Report issued in International Patent Application No. PCT/KR2005/002931 on Nov. 24, 2005.

U.S. Appl. No. 11/211,705, filed Aug. 26, 2005, Kwang-min Kim et al., Samsung Electronics Co., Ltd.

Chinese Notification of Granting of Patent Right to Invention issued Jul. 10, 2012 in Chinese Application No. 201010163537.1 (8 pages, including English language translation).

* cited by examiner

STORAGE MEDIUM STORING MULTIMEDIA DATA FOR REPRODUCTION OF AV DATA AND PROGRAMMING FUNCTION, AND REPRODUCING APPARATUS AND METHOD THEREOF

CROSS-REFERENCE TO RELATED APPLICATIONS

This application is a continuation of U.S. patent application Ser. No. 11/211,705, filed on Aug. 26, 2005, which claims the benefit of Korean Patent Application No. 2004-72215, filed on Sep. 9, 2004 now U.S. Pat. No. 7,826,713, in the Korean Intellectual Property Office, the disclosures of which are incorporated herein by reference.

BACKGROUND OF THE INVENTION

1. Field of the Invention

Aspects of the present invention relates to the reproduction of multimedia data, and more particularly, to a storage medium storing multimedia data for the reproduction of audio-visual (AV) data and a programming function, and a reproducing apparatus and method thereof.

2. Description of the Related Art

FIG. 1 illustrates a typical architecture of multimedia data for the reproduction of AV data. Referring to FIG. 1, multimedia data for the reproduction of audio-visual (AV) data, such as a high quality movie, can be classified into four layers, including AV data 3 and 4, navigation data 2, and system data 1.

The system data 1 in the fourth layer includes startup information, which indicates information on a movie object to be initially played when a storage medium such as a disc is inserted in a reproducing apparatus, and an index table including information on a plurality of titles. The index table is defined in the highest layer along with a plurality of titles and a menu, and further includes beginning position information of the plurality of titles and beginning position information of the menu, as well as the startup information. When a new title is selected by a user's input, menu selection, or navigation command, the reproducing apparatus confirms the information on the plurality of titles included in the index table and reproduces AV data based on the information.

The navigation data 2 in the third layer comprises movie objects 20, each including navigation commands for the reproduction of AV data. Using the navigation commands included in a movie object 20, the reproduction of a playlist 3, which is described below, in a lower layer starts, the movie objects 20 are switched over, and the reproduction of the playlist 3 is managed in response to the user's preference.

The playlist 3 in the second layer defines reproduction units of AV data. The AV data is recorded on consecutive spaces of a storage medium in clip units which are described below. The playlist 3 indicates a reproducing unit in which a portion of a clip is reproduced or a plurality of clips are bound and reproduced at once. The playlist 3 includes a plurality of playitems, which are smaller reproducing units. A playitem indicates a reproduction duration of a portion of a clip or a plurality of clips. Using the playlist 3, a reproduction sequence can be set so that a plurality of playitems are sequentially reproduced or so that predetermined playitems of the plurality of playitems are selectively reproduced, by the user's selection or basic settings of the reproducing apparatus.

The clip 4 in the first layer defines a recording unit of AV data. The clip 4 includes a clip AV stream and a clip information file. The clip AV stream comprises audio/video, subtitles, and graphic data. The clip information file includes an attribute of the clip AV stream and an entry point map used for converting reproduction time information to byte address information.

FIG. 2 is a block diagram of a conventional reproducing apparatus for AV data reproduction. Referring to FIG. 2, the reproducing apparatus includes a reader for reading data from a storage medium, a buffer unit for temporarily storing the read data, a module manager for controlling a navigation engine to read system data and process an initial operation and a title change due to a user's selection or a navigation change, the navigation engine for controlling the reproduction of AV data based on the contents of navigation data, and a presentation engine for decoding the AV data and displaying the decoded video data on a screen. Even though not shown, the reproducing apparatus can further include a blender for overlaying the decoded video data and graphical data on one screen.

The operation of reproducing multimedia data from the storage medium described in FIG. 1 will now be described using the reproducing apparatus described with respect to FIG. 2.

When the storage medium is inserted in the reproducing apparatus, the module manager reads the index table corresponding to the system data 1 from the multimedia data recorded on the storage medium. The module manager confirms startup information from the index table and controls the navigation engine to execute a movie object 20 directed by the startup information.

The navigation engine reads the movie object 20, analyzes navigation commands stored in the movie object 20, and controls the presentation engine to reproduce AV data according to the navigation commands.

The presentation engine reads the playlist 3 and the clip files 4 corresponding to the navigation commands, and reproduces clip AV streams based on information included in each file. Here, if a new title is selected by a user's input, a menu, or a navigation commander and so on, the module manager controls the navigation engine to reproduce the selected title according to the procedures described above. Accordingly, high quality AV data can be reproduced by reading the multimedia data from the storage medium.

Recently, in addition to the simple reproduction of AV data, a demand for various additional services and user interactive functions has been increasing. However, a conventional AV data storage medium is only used for simply reproducing the AV data according to the will of its producer, and can not provide the user interactive functions and various additional functions such as downloading new content related to AV content and/or displaying information related to the AV content.

Accordingly, program applications written in C, Java, HTML, and/or scripting languages need to be provided along with AV data, to provide various interactive functions with a user and/or additional functions. Unlike the reproduction of AV data in the order determined by its producer, by executing these applications, the reproduction of the AV data can be achieved according to various scenarios based on interactions with a user. Thus, a storage medium should provide information for controlling applications to operate in the way desired by a contents producer, along with the program applications.

On the other hand, the program applications can be used for malicious intent against the will of the content producer. That is, the program applications may directly read AV data that the content producer intends to protect, and deliberately distribute the AV data through other media, e.g., the internet or removable storage media. Therefore, program applications must be able to prevent AV data that a producer intends to protect from being illegally distributed.

SUMMARY OF THE INVENTION

Aspects of the present invention provide a storage medium storing multimedia data for the reproduction of audio-visual (AV) data and a programming function, which provides various interactive functions with a user and/or additional functions besides the simple reproduction of the AV data, and a reproducing apparatus and method thereof.

An aspect of the present invention also provides a storage medium storing program applications for preventing AV data that a producer intends to protect from being illegally distributed, and a reproducing apparatus and method thereof.

According to an aspect of the present invention, there is provided a storage medium comprising: reproduction mode data for reproducing audio-visual (AV) data; program data including a plurality of program applications, for providing interactive functions with a user and/or additional functions using the AV data; system data for controlling the execution of the reproduction mode data and the program data; and application objects for managing the execution of the program data and information on the reproduction mode data to be reproduced along with the execution of the program data.

Each of the application objects may include application management information for managing the execution of the program data and playlist information which is a reproduction unit of the reproduction mode data in title units. The application management information may include information on attributes of the program data and information on the operation of the program data.

The information on attributes of the program data may include at least one of location, name and version information of the program applications, and the information on the operation of the program data may include at least one of information on start, pause and end of the program applications, pre-load information, and pre-patch information. The program data may be an application program written in one of Java, HTML, C, and a scripting language. The playlist information may include a file name of at least one playlist reproduced along with the execution of the program data. As used in this specification, an expression of the form "one of X, Y and Z" corresponds to X, Y or Z; and an expression of the form "at least one of X, Y and Z" corresponds to X, Y, Z, X and Y, X and Z, Y and Z, or X and Y and Z.

According to another aspect of the present invention, there is provided a reproducing apparatus comprising: a reader which reads application objects from the storage medium; and a controller which manages execution of the program data based on the read application objects in title units.

The reproducing apparatus may further include an application manager which controls the reproduction of reproduction mode data and the execution of the program data based on the application objects.

Each of the application objects may include application management information for managing the execution of the program data, and playlist information which is a reproduction unit of the reproduction mode data in title units, and the application manager may control the operation of the program applications based on the application management information and reproduce AV data corresponding to the program applications along with the execution of the program applications based on the playlist information.

According to another aspect of the present invention, there is provided a reproducing method comprising: reading application objects from the storage medium; and managing the execution of the program data based on the read application objects in title units.

The reproducing method may further include controlling the reproduction of the reproduction mode data and the execution of the program data based on the application objects.

Controlling the reproduction of the reproduction mode data and the execution of the program data comprises: confirming a title selected from an index table included in the system data; confirming playlist information and application management information if the confirmed title is full mode data; reading a relevant playlist file from the reproduction mode data based on the confirmed playlist information; and reproducing AV data based on the playlist file read during the execution of a relevant program application from the program data based on the confirmed application management information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
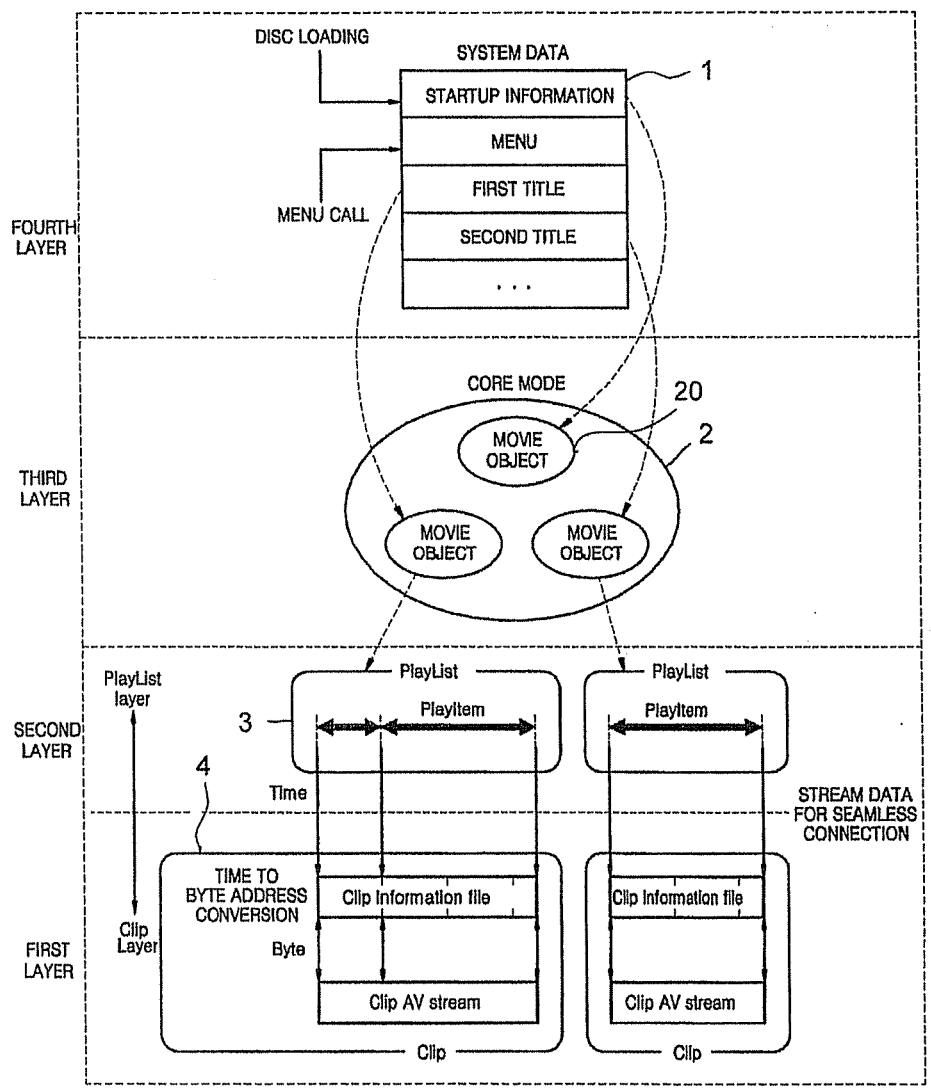
FIG. 1 illustrates a typical architecture of multimedia data for the reproduction of AV data.
Figure 2:
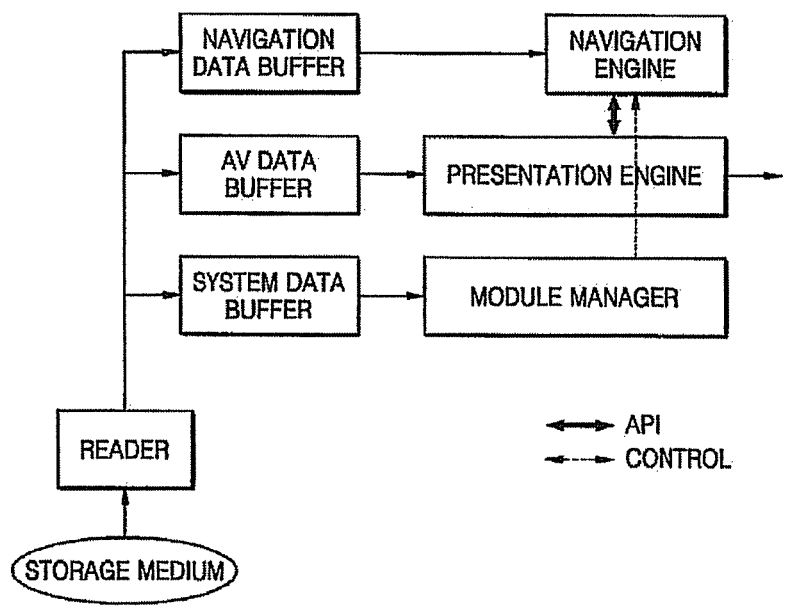
FIG. 2 is a block diagram of a conventional reproducing apparatus for AV data reproduction.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
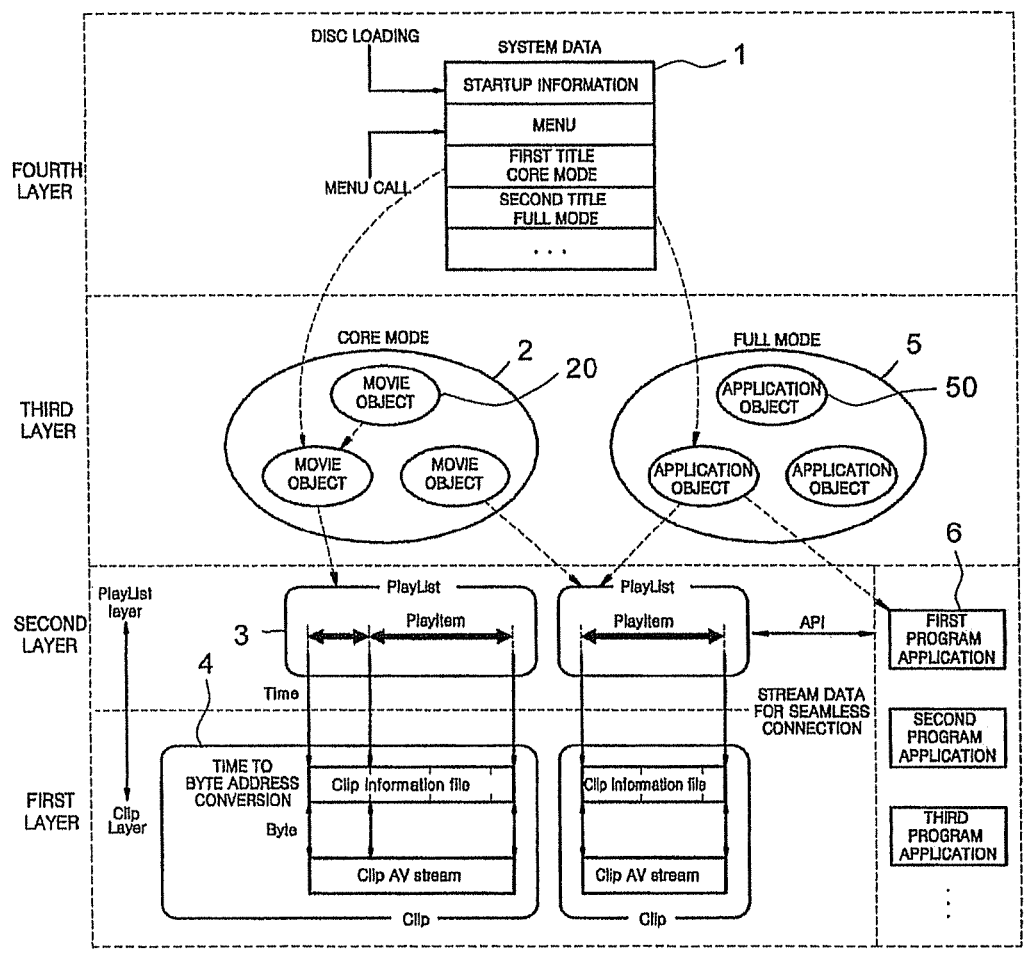
FIG. 3 illustrates an architecture of multimedia data for reproduction of AV data and a programming function according to an embodiment of the present invention.

FIG. 3 illustrates an architecture of multimedia data for the reproduction of AV data and a programming function according to an embodiment of the present invention.

Referring to FIG. 3, the multimedia data can be classified into four layers, including AV data 3 and 4, navigation data 2, and system data 1. In addition, the multimedia data further includes a plurality of program applications 6 and full mode navigation data 5 in order to provide the programming function. The full mode navigation data 5 includes a plurality of application objects 50.

When basic AV data is reproduced, the reproduction order and time is obtained by reading playlists 3 using a navigation command stored in a movie object 20 as described above. Also, the time information is converted to byte address information by reading a clip information file 4 corresponding to the reproduction time based on the reproduction order. The AV data is reproduced by reading clip AV streams 4 corresponding to the converted byte addresses. A mode in which AV data is simply reproduced based on time specified by a producer is called a core mode or movie mode.

A mode in which program applications performing program functions are reproduced together with AV data is called a full mode. The multimedia data may further include the plurality of program applications 6 and the plurality of application objects 50 for the full mode. That is, the multimedia data further includes the application objects 50 for performing program functions as well as the movie objects 20 for the simple reproduction of AV data. Accordingly, in the full mode, each program application provides a user interactive function and an additional function to a user while reproducing all or part of the AV data using an application program interface (API) with a playlist. That is, by synchronizing with a specific scene of a movie, specific information can be provided, or a predetermined program application 6 can operate.

For example, while reproducing the movie "The Matrix," at a scene in which a cellphone appears, an advertising application for the cellphone manufacturer can automatically be performed when a user clicks the cellphone using a control or pointing device such as, for example, a "mouse" or a "joystick." Also, while reproducing "The Lord of The Rings," when a panorama of mountains covered with snow is shown, an application providing a description, travel information, and special features of the actual location of the scene can be provided. Further, biographical or current information about actors in the movie can be provided.

Figure 4:
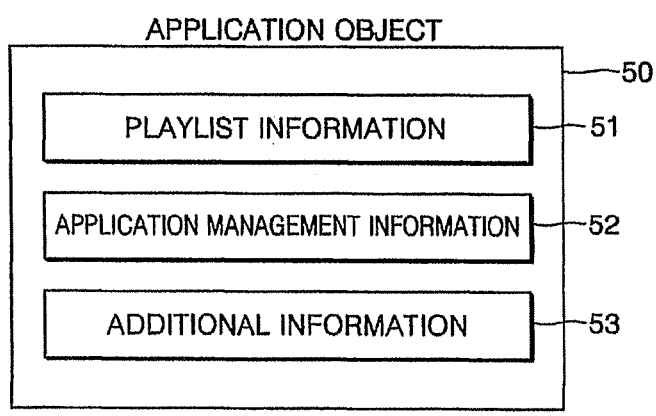
FIG. 4 illustrates a structure of an application object for the programming function according to an embodiment of the present invention.

FIG. 4 illustrates the structure of an application object 50 for the programming function according to an embodiment of the present invention. Referring to FIGS. 3 and 4, the application object 50 includes playlist information 51, application management information 52, and/or additional information 53.

A conventional storage medium can reproduce AV data in title units based on the intent of the content producer. The storage medium provided in the present embodiment also includes AV data and application data in title units. Titles are classified into core mode titles, including only AV data, and full mode titles, including AV data and application data together, based on kinds of multimedia data included in the storage medium. The core mode titles have the same structure as titles included in the conventional storage medium.

A full mode title includes at least one program application and a playlist of AV data to be reproduced by the program application. A movie object 20 included in a core mode title controls the reproduction of AV data based on playlists predefined by a producer using a navigation command. However, for a full mode title, a navigation command for the reproduction of AV data is unnecessary, since a program application 6 controls the reproduction of AV data. Instead, the full mode title requires the playlist information 51, for reproducing AV data desired by the producer, and the application management information 52, for controlling the operation of the program applications 6. The multimedia data in the present embodiment includes the application objects 50 for controlling the reproduction of the full mode titles using the playlist information 51 and the application management information 52.

Referring to FIG. 4, the playlist information 51 indicates a list of playlists of AV data used in a title. The program application 6 reads a list of a playlist 3 indicating a clip AV stream corresponding to a section to be reproduced from the clip AV streams 4, which are high quality AV data stored in the storage medium for reproducing all or part of a movie, and reproduces its corresponding AV data.

In particular, the playlist information 51 is not included in the full mode program application 6, but is separately managed by the application object 50, in order to maintain independence of application production and aid the reuse of the produced applications. In general, for a movie mode title, AV data 4, playlists 3, and movie objects 20 are produced together according to one purpose which is AV data reproduction. However, full mode program applications 6 can be produced regardless of the content of AV data. That is, if functions desired by a producer can be supported, then a third party can produce the program applications 6 regardless of the AV data, and a content producer can connect playlists 3 to the program applications 6. Accordingly, the independence of application production can be maintained.

Also, full mode program applications used in another title can be used for other AV data without modification. If the playlist information 51 is not provided by the application object 50, as in the present embodiment, the program application 6 must directly include playlist information needed for reproduction. Thus, even if a program application provides the same function, if related AV data of the program application is changed, the program application must be re-compiled or re-created. Therefore, in terms of the independence of application production and reuse of applications, the playlist information 51 may be included in the application object 50, separate from the program application 6.

The application management information 52 may include attribute information and operation information of the program applications 6. The attribute information of the program applications 6 includes location, name, and version information of the program applications 6. The operation information of the program applications 6 includes information for controlling life cycles of the program applications 6 such as start, pause, and end of the program applications 6, pre-load information, and pre-patch information.

Figure 5:
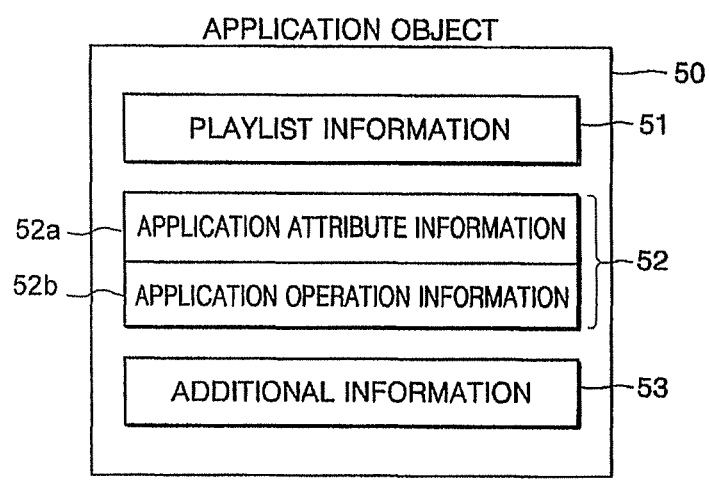
FIGS. 5 and 6 are examples of a structure of the application object for the programming function according to an embodiment of the present invention.
Figure 6:
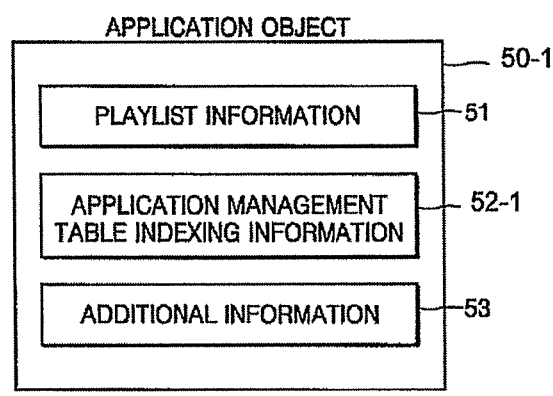

The application object 50 may directly manage the application management information 52, or may include only reference information to a separately defined application management table. FIGS. 5 and 6 are examples of the structure of the application object 50 for the programming function according to an embodiment of the present invention. In FIG. 5, the application object 50 directly manages the application management information 52, and in FIG. 6, the application object 50-1 separately defines an application management table 52-1.

The additional information 53 is information describing a full mode title. The additional information 53 can include title identifiers, title names, and/or title descriptions intelligible to a user. The additional information 53 is optional. The application objects 50 can exist in a form of separate files for respective titles or in a form of one file using the title identifiers.

Figure 7:
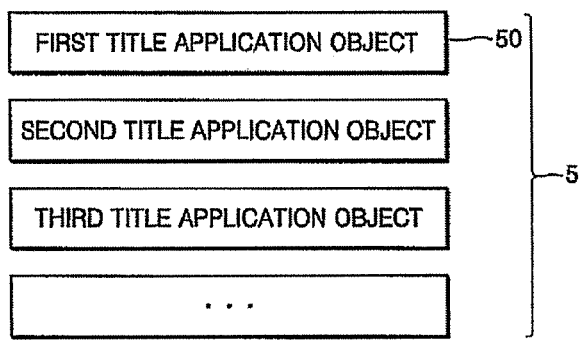
FIGS. 7 and 8 are examples of the structure of full mode navigation data for the programming function according to an embodiment of the present invention.
Figure 8:
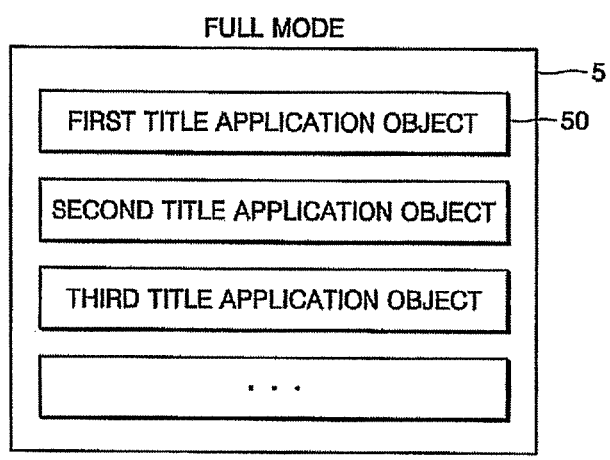

FIGS. 7 and 8 are examples of the structure of the full mode navigation data 5 for the programming function according to an embodiment of the present invention. The application objects 50 can exist in the form of separate files for respective titles, as in FIG. 7, or in the form of one file, as in FIG. 8. A reproducing apparatus for the reproduction of AV data and a programming function will now be described based on the architecture of the multimedia data described above.

Figure 9:
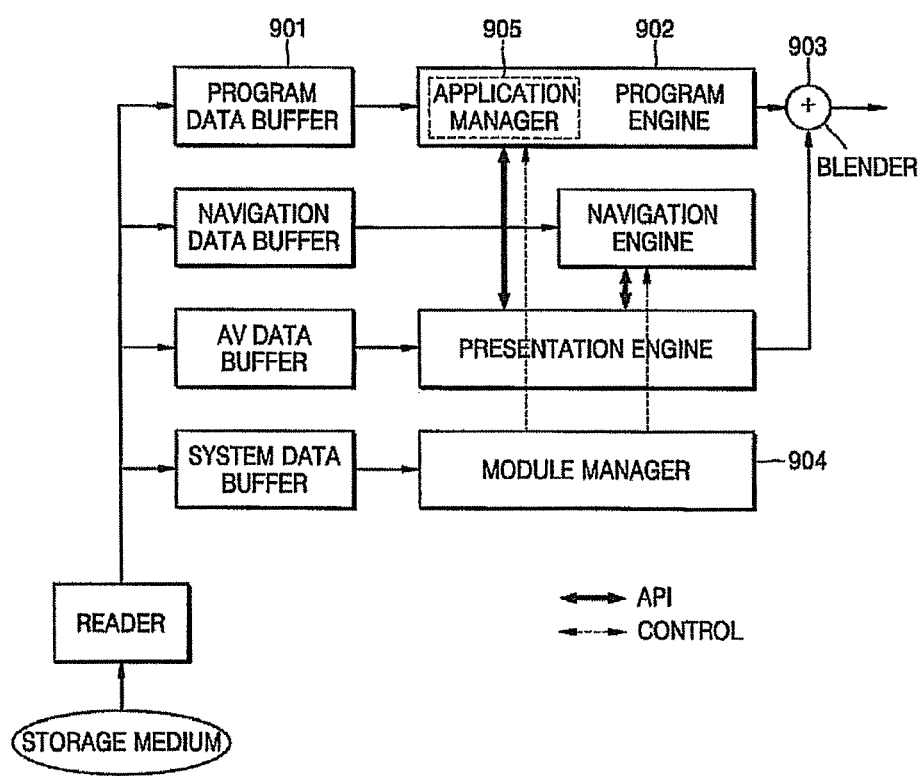
FIG. 9 is a block diagram of a reproducing apparatus for the reproduction of AV data and a programming function according to an embodiment of the present invention.

FIG. 9 is a block diagram of a reproducing apparatus for reproduction of AV data and a programming function according to an embodiment of the present invention. Referring to FIG. 9, the reproducing apparatus includes a reader for reading data from a storage medium, a buffer unit for temporarily storing the read data, a module manager 904 for controlling a navigation engine to read system data and process an initial operation and a title change due to a user's selection or a navigation change, the navigation engine, for controlling the reproduction of AV data based on the contents of navigation data, and a presentation engine for decoding the AV data and displaying the decoded video data on a screen.

The reproducing apparatus further includes a program engine 902 and a program data buffer 901 for executing program applications. According to the kinds of program applications, a plurality of program engines can be used. For example, for reproducing a Java application and an HTML application together, a Java virtual machine and a browser engine application are necessary. A blender is further included to form one picture by overlaying an application execution result of the program engine 902 and an AV data reproduction result of the presentation engine.

The program engine 902 may further include an application manager 905 for controlling execution of program applications using the application objects 50 in order to provide the program function. That is, the application manager 905 included in the program engine 902 reads the playlist information 51 and the application management information 52 included in the application objects 50, and controls the execution of their corresponding program applications 6.

Although the module manager 904 and the application manager 905 are formed separately in the present embodiment, the reproducing apparatus can be adapted so that the application manager 905 additionally performs the function of the module manager 904.

Figure 10:
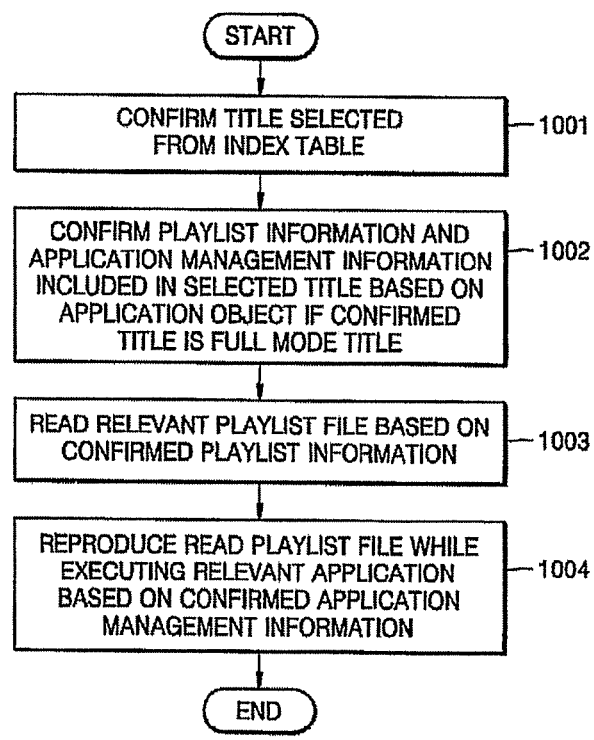
FIG. 10 is a flowchart illustrating a reproducing method for the reproduction of AV data and a programming function according to an embodiment of the present invention.

The operation of reproducing the multimedia data from the storage medium described in FIGS. 3 and 4 will now be described using the reproducing apparatus described in FIG. 9. FIG. 10 is a flowchart illustrating a reproducing method for the reproduction of AV data and a programming function according to an embodiment of the present invention. Referring to FIG. 10, a full mode title is reproduced in the order described below.

If the full mode title is selected by a user's input, a menu, or a navigation command, the module manager 904 reads system data 1 in operation 1001. The module manager 904 can obtain selected title information using an index table, which is the system data 1. The index table 1 included in the storage medium can direct a movie mode title and a full mode title. If the title selected from the index table 1 is a movie mode title, the title is executed through a movie object 20 of the title. If the title is a full mode title, the title is executed through an application object 50.

There are various methods of obtaining title information through the index table 1. An object for each item of title information, i.e., a movie object 20 or an application object 50, is directed in the index table 1. For the application object 50, application management information 52 can be included in the application object 50 as shown in FIG. 5. Or, as shown in FIG. 6, an application management table (AMT) storing the application management information 52 can be stored separately, and the application object 50 can include only reference information of the AMT. In any case, the application management information 52 can include attribute information 52a, such as the location, the name, and the version of a program application 6, and operation information 52b such as start, pause, and end of the program application 6, preload information, and pre-patch information. The application object 50 includes playlist information 51 of AV data to be reproduced with the program application 6.

If the title is a full mode title, the application manager confirms the playlist information 51 and application management information 52 included in the selected title based on the application object 50 in operation 1002. The application manager confirms which program application 6 is needed for the title and where that program application 6 is stored, by reading the attribute information of the program application 6 based on the application object 50, and controls the execution of the program application 6 by reading the operation information of the program application 6. That is, the application manager 905 controls lifecycles such as start, pause, and end of the program application 6, and whether to preload necessary data based on the operation information of the program application 6.

The program engine 902 is an engine for reproducing the program applications 6, and in particular, when some program applications 6 are implemented using Java, the program engine 902 includes a Java virtual machine (JavaVM). The application manager 905 controls the execution of a relevant program application 6 through the program engine 902 based on the application management information 52.

The application manager 905 reads a list of playlists 3 of AV data to be reproduced, along with the execution of the relevant program application 6, using playlist information 51 included in the application object 50, in operation 1003. Here, the application manager 905 can read all playlists 3 included in the list of playlists in a bundle, or the application manager 905 can read only one playlist 3 defined in advance as a default, and then read the remaining playlists 3 at a request of the program applications 6. The application manager 905 can also read information on a clip to be reproduced based on information on the playlist 3 which has been read. Also, the application manager 905 temporarily stores the read playlist and the read information on the clip in a memory of the reproducing apparatus, in a form of a database. The program application 6 obtains the temporarily stored playlist 3 and the information on the clip through a specific API, and reproduces a clip AV stream based on the playlist 3 and the information on the clip. In addition, the program application 6 can provide a necessary menu to a user. The application manager 905 can reproduce the playlist file 3 while executing the program application 6 based on the application management information 52, in operation 1004.

The reproducing apparatus may provide an additional function of displaying a description of a currently reproduced title using additional information 53.

In brief, the module manager 904 confirms a selected title from an index table included in system data 1, in operation 1001. If the confirmed title is a full mode title, the application manager 905 confirms playlist information 51 and application management information 52 by obtaining information on an application object 50 directed by title information, in operation 1002. The application manager reads a relevant playlist file 3 from AV data, based on the confirmed playlist information 51, in operation 1003 and reproduces the AV data based on the read playlist file 3 while executing a relevant program application 6 based on the confirmed application management information 52, in operation 1004.

As described above, according to aspects of the present invention, a program application 6 implemented in a programming language such as Java does not directly read a playlist file 3, but instead, the application manager 905, which is a portion of the program engine 902 of the reproducing apparatus, reads the playlist 3 and a clip file 4 corresponding to the playlist 3, and stores the read playlist 3 and clip file 4 in a temporary data base. The stored playlist 3 and clip file 5 are provided to the program application 6 through a specific API. This gives the following benefits.

First, a wrongly programmed program application 6, or a program application 6 having malicious intent, can not directly read a clip AV stream. Thus, the program application 6 is prevented from using the clip AV stream for purposes such as illegal duplication or distribution. The program application 6 can obtain only AV data analyzed by the application manager 905 through the specific API. When the program application 6 intends to reproduce the AV data, the program application 6 transmits clip file information such as a clip file name, obtained through the specific API, to the presentation engine reproducing the AV data. That is, the program application 6 provides only information required for reproducing the AV data, and is not able to directly read the AV data.

Second, program applications 6 can be easily reused. The same program applications 6 can provide their functions for different AV data without modification. For example, in a case of a program application 6 for reproducing a movie, the program application 6 can be used without recompiling the playlist information 51. Normally, if a program application 6 written in a universal programming language, such as Java, contains playlist information 51, then every time the playlist information 51 is changed, the program application 6 must be recompiled with the changed playlist information 51. However, according to aspects of the present invention, playlist information 51 is not included in a program application 6, and the application manager 905 provides the playlist information 51 using an application object 50. Accordingly, any program application 6 having the same function can reproduce a clip AV stream by obtaining playlist information 51 corresponding to the clip AV stream through a predefined specific API, without modification or recompiling. It is easier for a content producer to produce storage media, since the content producer does not have to prepare new program applications for titles which differ only in their content of AV data.

A method of reproducing multimedia data for AV data reproduction and a program function according to an embodiment of the present invention can be written as a computer program. Codes and code segments constructing the program can be easily deducted by a programmer of ordinary skill in the art. The program implements the method of reproducing multimedia data for AV data reproduction and a program function by being stored in computer readable media, read by a computer, and executed by the computer. The computer readable media include magnetic storage media, optical recording media, and carrier wave media.

As described above, the embodiments of the present invention provide a storage medium storing multimedia data for the reproduction of audio-visual (AV) data and a programming function, which provides various interactive functions with a user and/or additional functions besides the simple reproduction of the AV data, and a reproducing apparatus and a method thereof.

That is, by storing information on AV data to be reproduced in an application object separate from a program application, along with control information on the program application, the program application is prevented from being used for malicious intent, and program applications having the same function can be reused without modification or recompilation.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A reproducing method to reproduce a title that corresponds to an application object of a storage medium, the reproducing method comprising: obtaining title information from an index table to determine the corresponding application object, the storage medium comprising the index table, audio-visual (AV) data, one or more playlist files, one or more program applications, and the corresponding application object, each of the playlist files comprising a playlist, the playlist being information to reproduce the AV data, the program applications providing interactive functions with a user and/or additional functions using the AV data, the corresponding application object comprising management information regarding an application and playlist information;

reading the corresponding application object; managing execution of the application based on the management information of the read corresponding application object;

and controlling the reproduction of the AV data based on the playlist information of the read corresponding application object, wherein the management information comprises a name of the application, information on a lifecycle of the application, and preload information comprising information on data to be preloaded, and wherein the playlist information comprises a name of one of the playlist files comprising a playlist to be reproduced along with the execution of the application.

2. A reproducing apparatus to reproduce a title that corresponds to an application object of a storage medium, the reproducing apparatus comprising: a reader configured to obtain title information from an index table, the storage medium comprising the index table, audio-visual (AV) data, one or more playlist files, one or more program applications, and the corresponding application object, each of the playlist files comprising a playlist, the playlist being information to reproduce the AV data, the program applications being configured to provide interactive functions with a user and/or additional functions using the AV data, the corresponding application object comprising management information regarding an application and playlist information; and a controller configured to determine the corresponding application object based on the obtained title information, manage execution of the application based on the management information of the read corresponding application object, and control the reproduction of the AV data based on the playlist information of the read corresponding application object, wherein the management information comprises a name of the application, information on a life cycle of the application, and preload information comprising information on data to be preloaded, and wherein the playlist information comprises a name of one of the playlist files comprising a playlist to be reproduced along with the execution of the application.

* * * * *